US011147996B2

(12) United States Patent
Harding et al.

(10) Patent No.: US 11,147,996 B2
(45) Date of Patent: Oct. 19, 2021

(54) TRANSPORTABLE FIRE TRAINING APPARATUS AND METHOD

(71) Applicant: Utah Valley University, Orem, UT (US)

(72) Inventors: David Harding, American Fork, UT (US); Reed Rieske, Orem, UT (US); Gary Kilgore, Midway, UT (US); David Owens, Kaysville, UT (US); Raleigh Bunch, Salt Lake City, UT (US); Charles Tandy, Washington, UT (US); Charles Querry, Riverton, UT (US); Hugh Conner, Sandy, UT (US); Rickey Hathaway, Mapleton, UT (US)

(73) Assignee: Utah Valley University, Orem, UT (US)

( * ) Notice: Subject to any disclaimer, the term of this patent is extended or adjusted under 35 U.S.C. 154(b) by 77 days.

(21) Appl. No.: 16/778,568

(22) Filed: Jan. 31, 2020

(65) Prior Publication Data
US 2020/0164240 A1   May 28, 2020

Related U.S. Application Data

(63) Continuation of application No. 14/460,181, filed on Aug. 14, 2014, now abandoned.
(Continued)

(51) Int. Cl.
*A62C 99/00* (2010.01)
*B60G 17/017* (2006.01)
(Continued)

(52) U.S. Cl.
CPC .......... *A62C 99/0081* (2013.01); *B60G 11/27* (2013.01); *B60G 17/017* (2013.01);
(Continued)

(58) Field of Classification Search
CPC ........................ A62C 99/0081; B60G 11/27; B60G 17/0155; B60G 17/017; B60G 2300/38; B60G 2500/30; B60G 2800/203
(Continued)

(56) References Cited

U.S. PATENT DOCUMENTS 2,142,216 A   1/1939 Seyrerth
5,833,294 A   11/1998 Williams et al.
(Continued)

FOREIGN PATENT DOCUMENTS

WO      2013000019 A1    1/2013
WO   WO-2013000019 A1 *  1/2013 ......... A62C 99/0081

*Primary Examiner* — Jerry-Daryl Fletcher
*Assistant Examiner* — Jennifer L Korb
(74) *Attorney, Agent, or Firm* — Kunzler Bean & Adamson

(57) ABSTRACT

A transportable fire training apparatus includes a trailer frame having a rear raised section at a rear end of the trailer frame and an unraised section at a middle portion of the trailer frame, a shell attached to the trailer frame and partitioned into a plurality of training rooms, a rear multi-axle wheel set disposed below, and attached to, the rear raised section of the trailer frame via an air ride suspension system that raises the trailer frame relative to the a rear multi-axle wheel set in response to pressurization of the air ride suspension system. The unraised section of the trailer frame rides substantially above the ground when the air ride suspension system is in a pressurized state and rests on the ground when the air ride suspension system is in an unpressurized state. A method for deploying and using the transportable fire training apparatus is also disclosed herein.

20 Claims, 12 Drawing Sheets

Related U.S. Application Data

(60) Provisional application No. 61/866,386, filed on Aug. 15, 2013.

(51) Int. Cl.
*B60G 17/015* (2006.01)
*B60G 11/27* (2006.01)

(52) U.S. Cl.
CPC ...... *B60G 17/0155* (2013.01); *B60G 2300/38* (2013.01); *B60G 2500/30* (2013.01); *B60G 2800/203* (2013.01)

(58) Field of Classification Search
USPC ........................................................ 434/226
See application file for complete search history.

(56) References Cited

U.S. PATENT DOCUMENTS

| | | |
|---|---|---|
| 6,302,475 B1 | 10/2001 | Anderson |
| 6,655,723 B2 | 12/2003 | Meijer et al. |
| 8,360,782 B1 | 1/2013 | Temple |
| 2005/0233289 A1* | 10/2005 | Hoglund ............ A62C 99/0081 434/226 |
| 2006/0101727 A1 | 5/2006 | Holgerson et al. |
| 2009/0188188 A1* | 7/2009 | Rivet ................. A62C 99/0081 52/270 |
| 2011/0121555 A1 | 5/2011 | Anderson |
| 2012/0244512 A1* | 9/2012 | Norris ..................... G09B 9/00 434/387 |

* cited by examiner

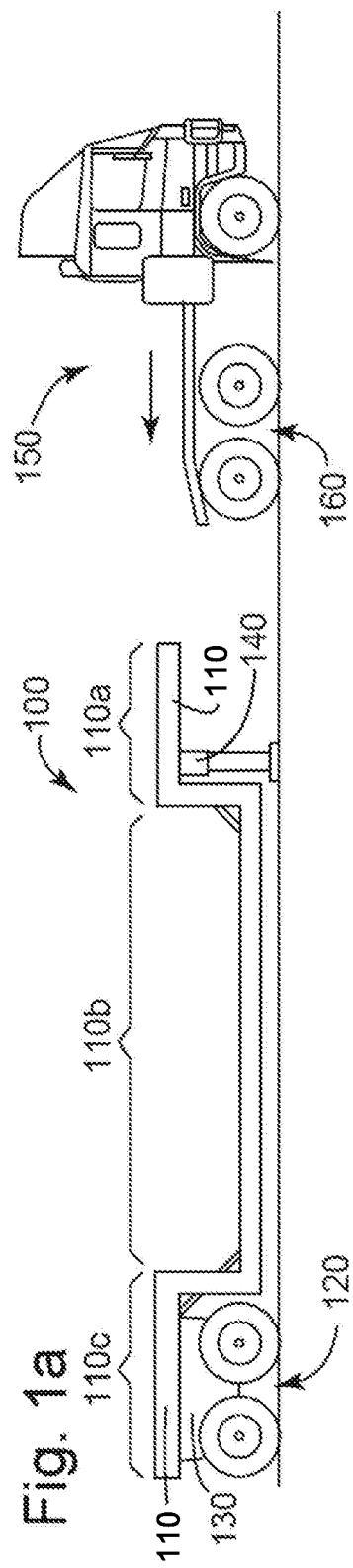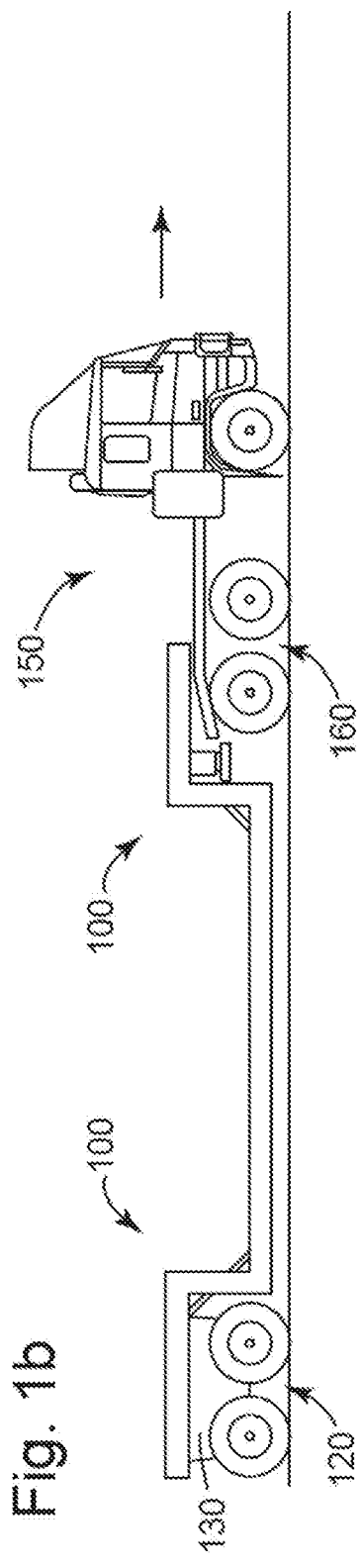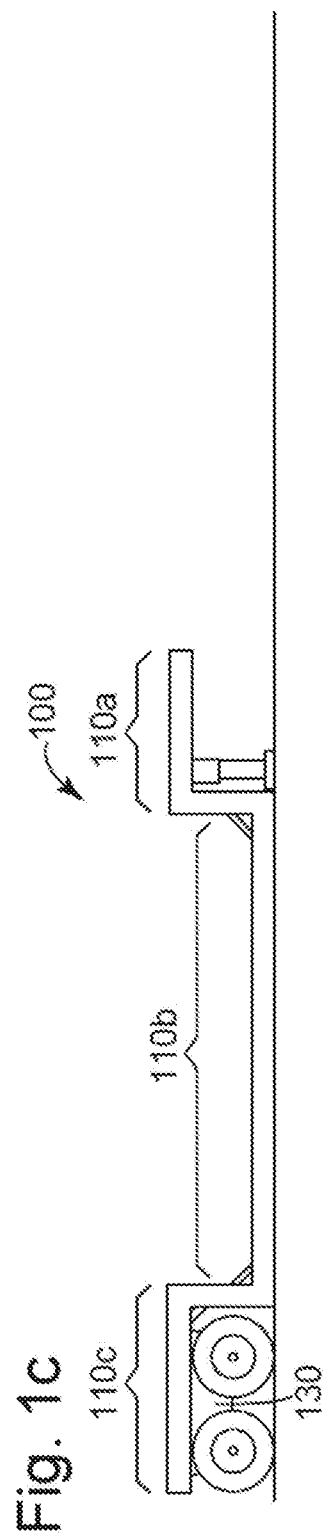

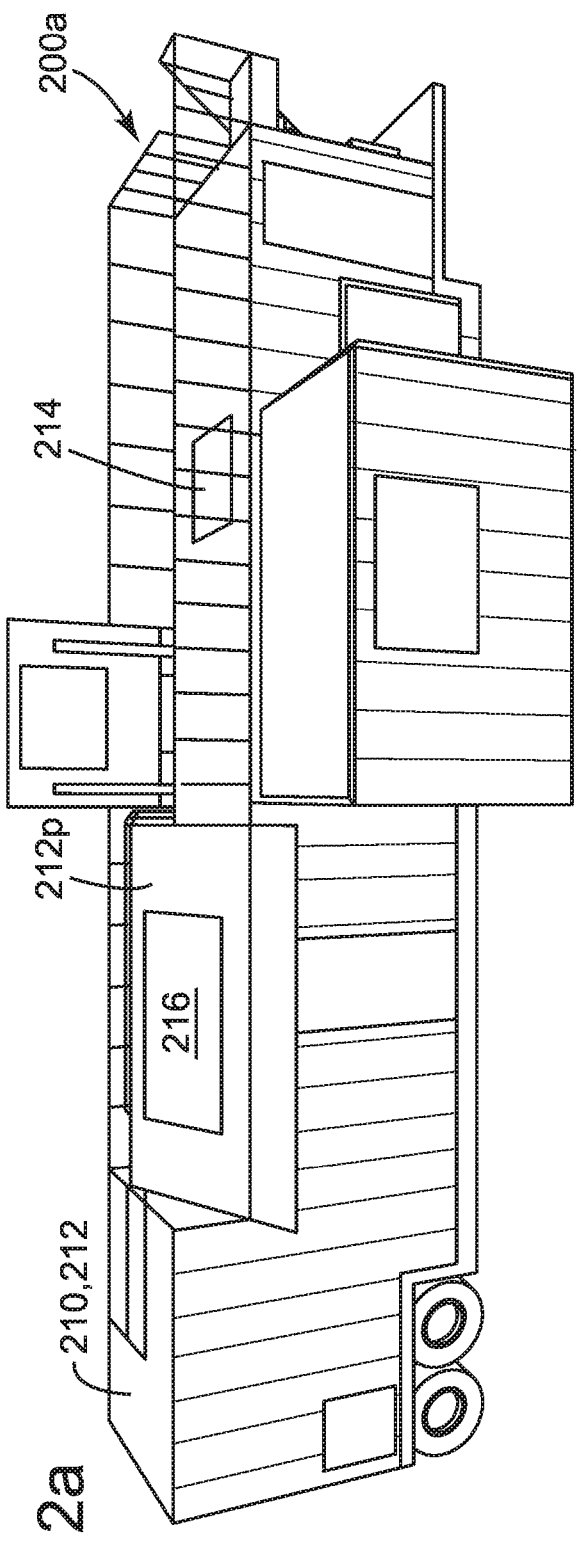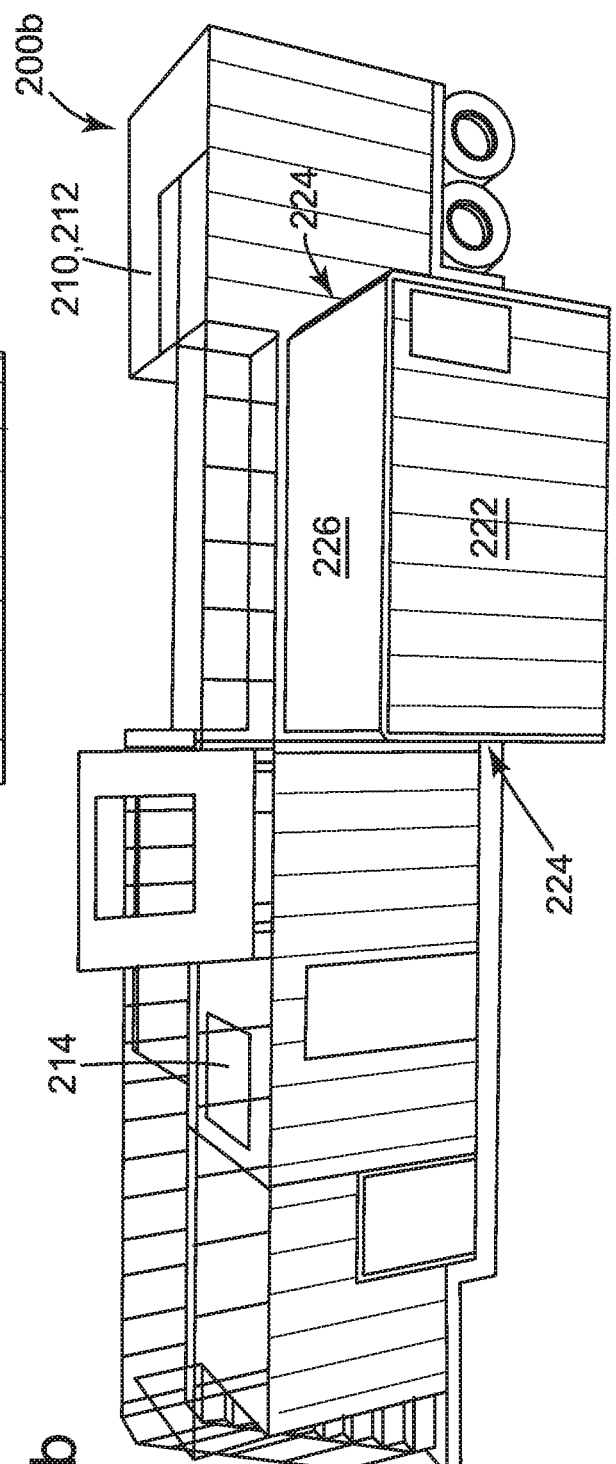

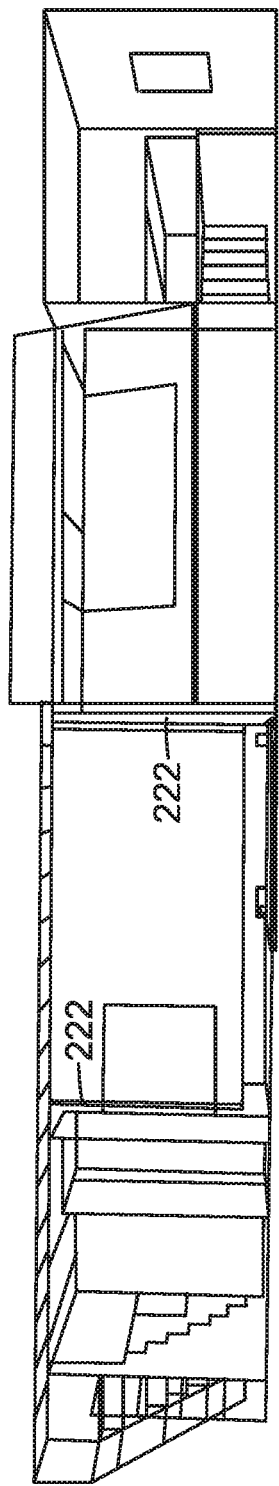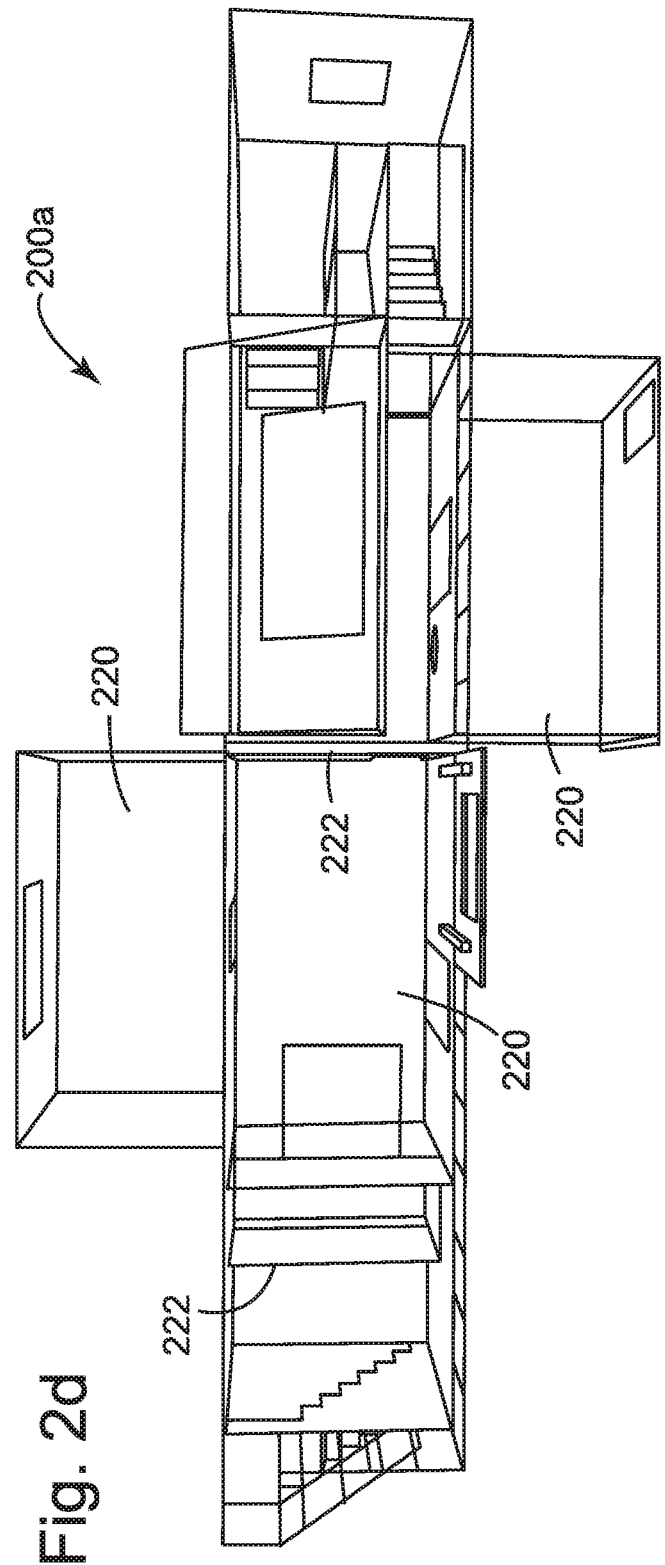

1100

1100

1200

TRANSPORTABLE FIRE TRAINING APPARATUS AND METHOD

CROSS-REFERENCES TO RELATED APPLICATIONS

This is a continuation application of and claims priority to U.S. patent application Ser. No. 14/460,181 entitled "TRANSPORTABLE FIRE TRAINING APPARATUS AND METHOD" and filed on Aug. 14, 2014 for David Harding et al., which claims the benefit of U.S. Provisional Patent Application No. 61/866,386 entitled "Transportable Fire Training Prop" and filed on Aug. 15, 2013, each of which is incorporated herein by reference.

FIELD

The subject matter disclosed herein relates to personnel training and more particularly relates to apparatuses and methods for training fire fighters.

BACKGROUND

While nearly all communities have emergency personnel such as police, medical technicians, and fire fighters, many communities do not have facilities, or have limited facilities, for fire training of such personnel.

SUMMARY

The present invention has been developed in response to the present state of the art, and in particular, in response to capabilities that have not yet been provided by currently available fire training facilities and methods. Accordingly, the present invention has been developed to provide a transportable fire training apparatus and method.

As described herein, a transportable fire training apparatus includes a trailer frame having a rear raised section at a rear end of the trailer frame and an unraised section at a middle portion of the trailer frame, a shell attached to the trailer frame and partitioned into a plurality of training rooms, and a rear multi-axle wheel set disposed below, and attached to, the rear raised section of the trailer frame via an air ride suspension system that raises the trailer frame relative to the a rear multi-axle wheel set in response to pressurization of the air ride suspension system. The air ride suspension system enables the unraised section of the trailer frame to ride substantially above the ground when the air ride suspension system is in a pressurized state and the unraised section of the trailer frame to rest on the ground when the air ride suspension system is in an unpressurized state. A method for deploying the apparatus and training personnel is also described herein.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1a-1c are side view illustrations of a semi-trailer and tractor that are a suitable platform for providing a transportable fire training apparatus;

FIGS. 2a-2d are perspective view sketches of a transportable fire training apparatus;

DETAILED DESCRIPTION

Figure 3:
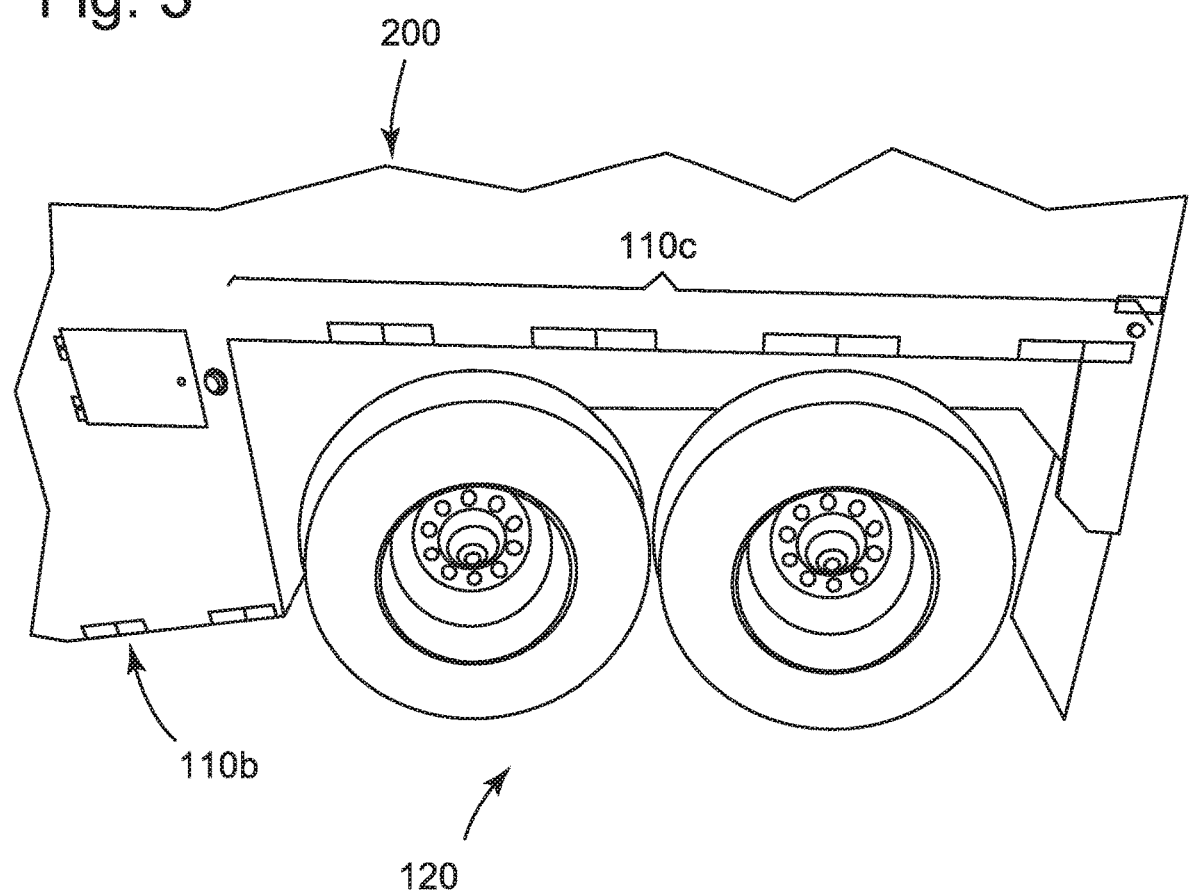
FIG. 3 is a perspective view drawing of a multi-axle rear wheel set disposed below a raised rear section of a transportable fire training apparatus.

FIGS. 1a-1c are side view illustrations of a semi-trailer 100 and tractor 150 that are a suitable platform for providing a transportable fire training apparatus. The depicted semi-trailer 100 includes a trailer frame 110 having a rear raised section 110a at a rear end of the trailer frame and an unraised section 110b at a middle portion of the trailer frame. The trailer frame may also include a front raised section 110c at a front end of the trailer frame.

The semi-trailer 100 may include a rear multi-axle wheel set 120. The rear multi-axle wheel set 120 may be disposed below, and attached to, the rear raised section 110a of the trailer frame 110 via an air ride suspension system 130. The air ride suspension system 130 may raise the trailer frame 110 relative to the rear multi-axle wheel set in response to pressurization of the air ride suspension system 130. For example the air ride suspension system 130 may include a bellows, air bag, or similar expandable device that raises the trailer frame 110 when filled with air.

The front raised section 110c may be configured to removably attach to the tractor 150. The tractor 150 may have a multi-axle wheel set 160 that facilitates hauling a large load. The ability to haul a large load enables providing a transportable fire training apparatus with a larger weight and footprint.

The semi-trailer 100 may include one or more extendable landing supports 140 that are attached to the front raised section 110a of the trailer frame 110 and provide support when extended. In one embodiment, each extendable landing support 140 includes a hydraulic ram that enables extension and retraction of the landing supports.

As shown in FIG. 1a, the extendable landing supports 140 may be fully extended and the air ride suspension system 130 may be pressurized to enable moving the tractor 150 under the front raised section 110a of the trailer frame 110. Subsequently, as shown in FIG. 1b, the extendable landing supports 140 may be fully retracted and the air ride suspension system 130 may remain pressurized such that the trailer frame 110, including the unraised section 110b, rides substantially above the ground. Maintaining the air ride suspension system 130 in a pressurized state enables moving the semi-trailer 100 with the tractor 150. For example, the semi-trailer 100 (and any fire training apparatus mounted thereon) may be transported to a location to conduct fire training exercises. As shown in FIG. 1c, the extendable landing supports 140 may then be partially extended and the air ride suspension system 130 may unpressurized in order to rest the semi-trailer 100 in general, and the unraised section 110b of the trailer frame in particular, directly on the ground. Resting the semi-trailer 100 on the ground enables conducting fire training exercises with a larger number of personnel, equipment, and greater water flow.

FIGS. 2a-2d are perspective view sketches of a transportable fire training apparatus 200 with a shell 210 attached to a semi-trailer 100. FIGS. 2a and 2b are perspective (180 degree rotated) side views of the apparatus 200 in a training configuration 200 a. FIGS. 2c and 2d are perspective plan views of the same apparatus 200 shown with portions of the roof removed to facilitate viewing of the interior of the apparatus including a plurality of training rooms 220. FIG. 2c depicts the apparatus 200 in a transport configuration 200 b while FIG. 2d depicts the transportable fire training apparatus 200 in the training configuration 200 a.

The shell 210 may be partitioned into the plurality of training rooms 220 via one or more walls 222. The depicted shell 210 includes a roof 212 with an access panel 214 for providing access to the roof from within the shell. Some, or all, of the roof may be sloped similar to a conventional home to provide a pitched roof 212p. The roof 212 may also include replaceable breakthrough panel 216 made of wood, or the like, that enables trainees to break through the roof as may be required in a residential fire.

The transportable fire training apparatus 200 may include one or more slideouts 230 that expand the training area. The slideouts 230 may be extended with an extension mechanism (not shown in these Figures) to place the fire training apparatus 200 in the training configuration 200 a. [The extension mechanism may include one or more hydraulic rams.] Placing the fire training apparatus 200 in the training configuration 200 a increases both the volume and area of the transportable fire training apparatus 200 and provides a more realistic training environment.

The slideouts 230 may also be retracted by the extension mechanism to place the fire training apparatus 200 in the transport configuration 200 b to facilitate transport of the apparatus. The slideouts 230 may include exterior walls 232, slideout walls 234, and slideout ceilings 236. In some embodiments, the slideouts 230 include one or more windows 238. In one embodiment, a slideout window 238 has a width and a height that are substantially similar to the width and height of a standard bathroom window.

FIG. 3 is a perspective view drawing of one embodiment of the rear multi-axle wheel set 120 disposed below a raised rear section 110c of a transportable fire training apparatus 200. In the depicted embodiment, the fire training apparatus 200 is shown in the training configuration 200 a where the air ride suspension system 130 is in an unpressurized state and the unraised section 110b of the transportable fire training apparatus 200 rests on the ground.

Figure 4:
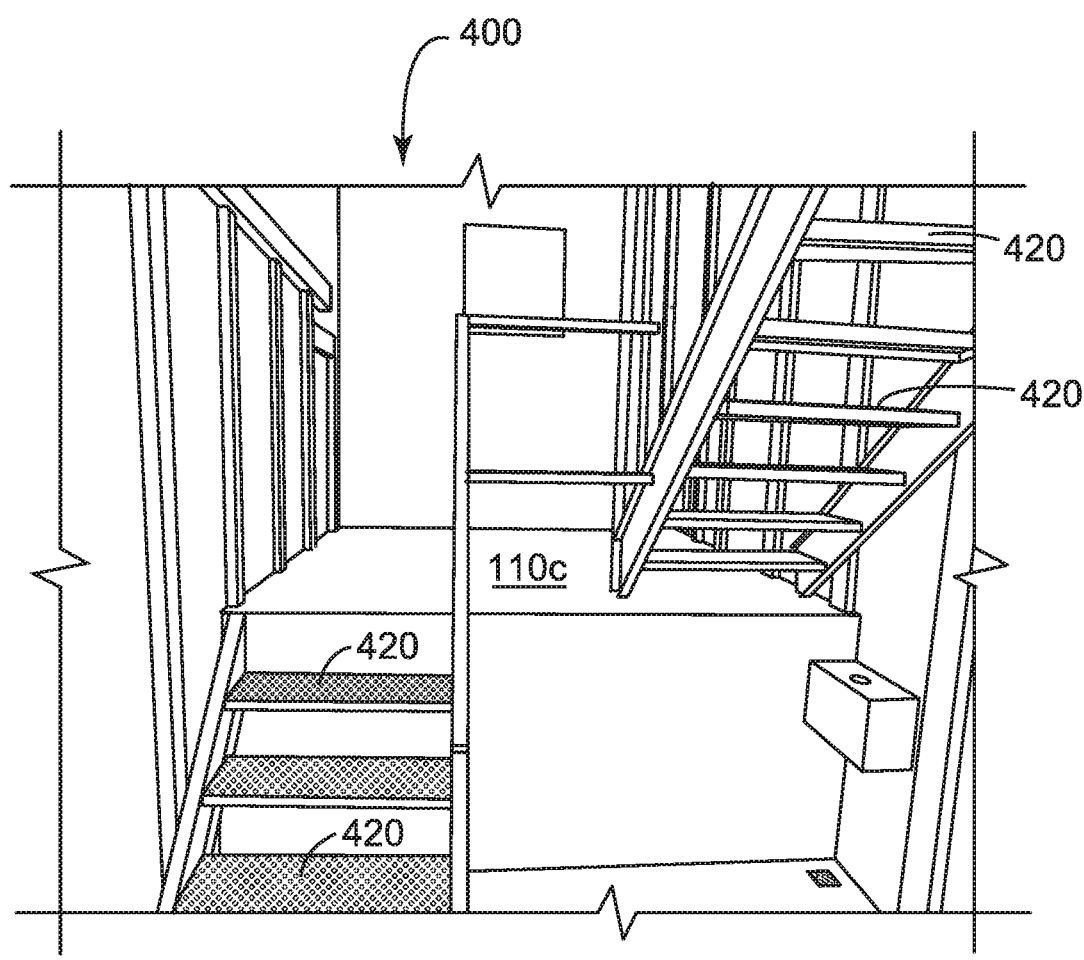
FIG. 4 is a perspective view drawing of an interior stairwell within one embodiment of the transportable fire training apparatus.

FIG. 4 is a perspective view drawing of an interior stairwell 400 within one embodiment of the transportable fire training apparatus 200. In the depicted embodiment, the interior stairwell 400 includes stairs 420 that facilitate access to the rear raised section 110c of the semi-trailer 110 and to the roof (not shown) from the unraised section 110b of the semi-trailer 110. The interior stairwell 400 provides an environment that is similar to stairwells within apartment complexes and the like.

Figure 5A:
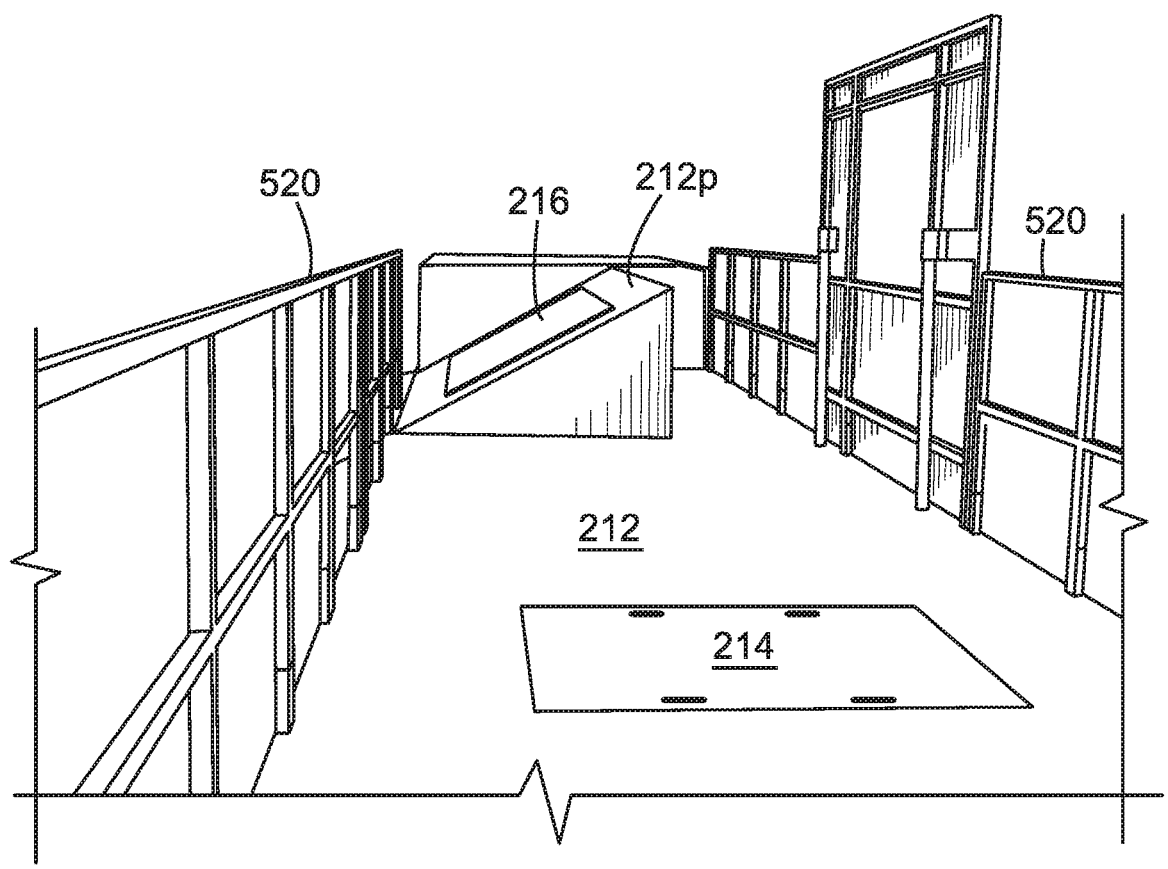
FIGS. 5a and 5b are perspective view drawings of particular aspects of a roof of one embodiment of the transportable fire training apparatus.
Figure 5B:
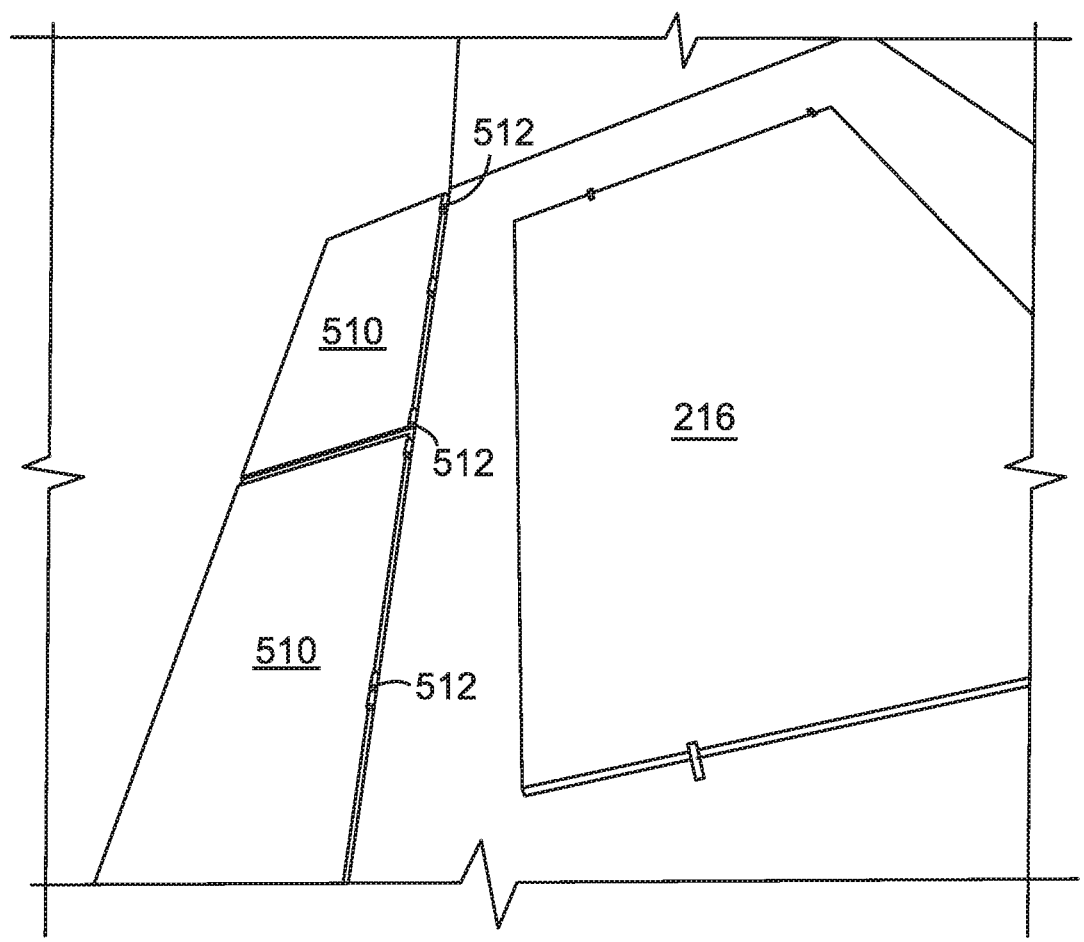

FIGS. 5a and 5b are perspective view drawings of particular aspects of the roof 212 of one embodiment of the transportable fire training apparatus 200. The access panel 214 may provide access to the roof from within the shell. In the depicted embodiment, the roof 212 includes a pitched portion 212p with a replaceable breakthrough panel 216 made of wafer board or the like, that is similar to a conventional roof. The roof 212 may include one or more fold down roof extensions 510 that are attached to the shell via one or more hinges 512. The hinges 512 enable the roof extensions 510 to be rotated into place to extend the pitched roof 212p and simulate a roof overhang. The roof 212 may also be encompassed by a rail 520 to improve safety. In some embodiments, the posts of the rail 520 are hinged to enable folding the rails into a horizontal orientation for transport.

Figure 6:
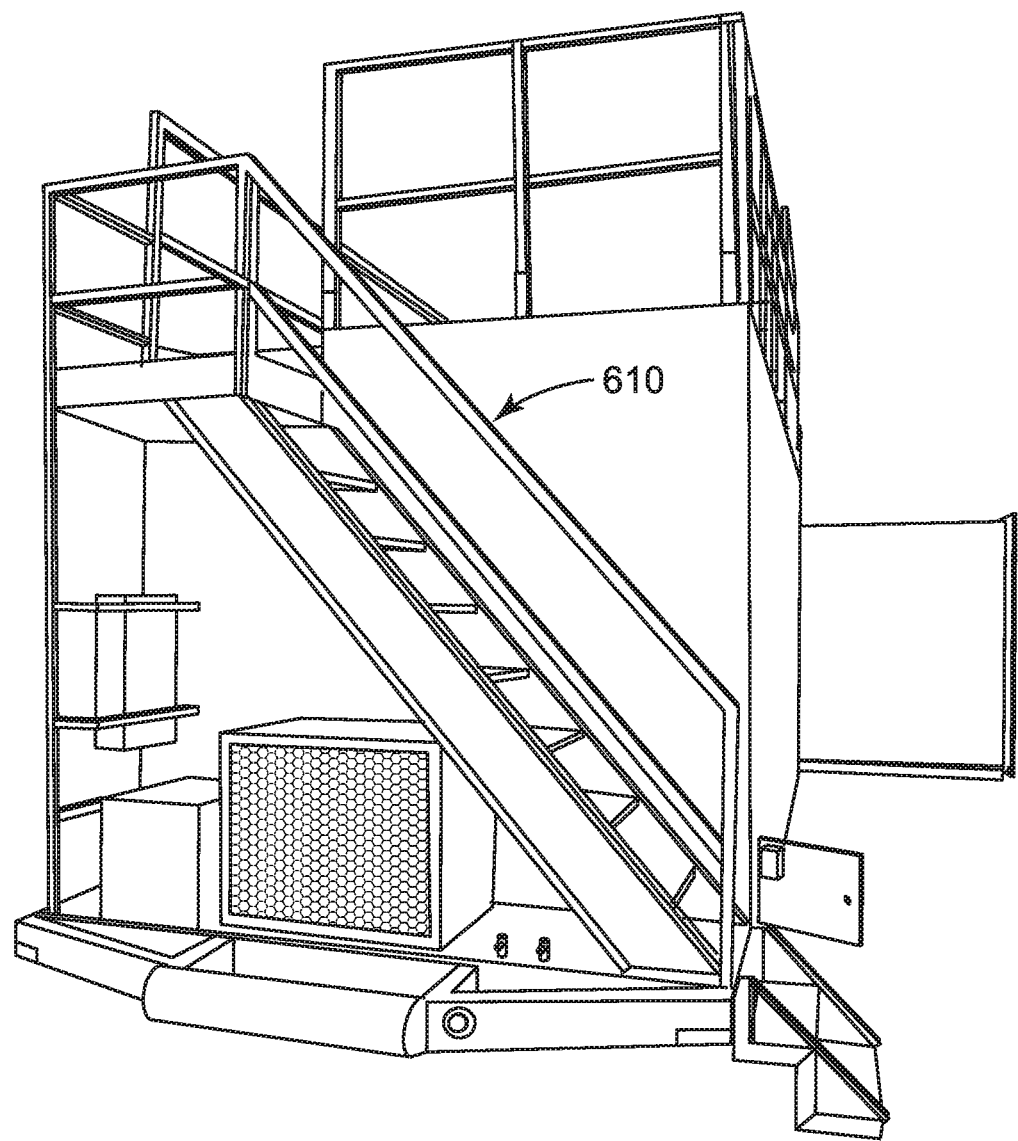
FIG. 6 is a perspective view drawing of a front end of one embodiment of the transportable fire training apparatus.

FIG. 6 is a perspective view drawing of a front end 600 of one embodiment of the transportable fire training apparatus 200. As depicted, the front end 600 includes an exterior staircase 610 that provides access to the roof. The exterior staircase 610 may be similar to fire escape staircases found on some conventional buildings.

Figure 7:
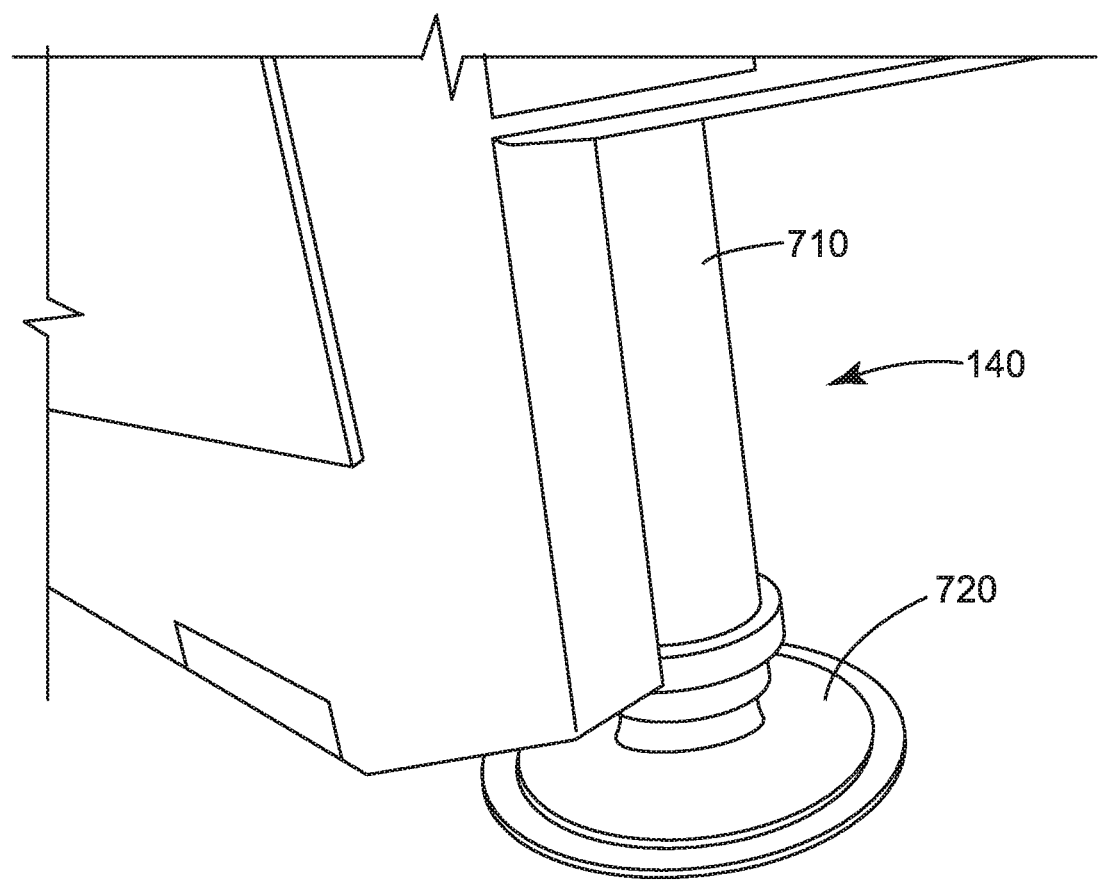
FIG. 7 is a perspective view drawing of one embodiment of an extendable landing support.

FIG. 7 is a perspective view drawing of one embodiment of the extendable landing support 140. As depicted, the extendable landing support 140 includes a hydraulic RAM 710 connected to a pedestal 720. When engaged the hydraulic RAM 710 may extend and push the pedestal 720 against the ground to provide stability to the transportable fire training apparatus 200. Alternately, engaging the hydraulic RAM 710 may enable lifting the fire training apparatus to facilitate docking the transportable fire training apparatus 200 to a tractor 150 for transport.

Figure 8:
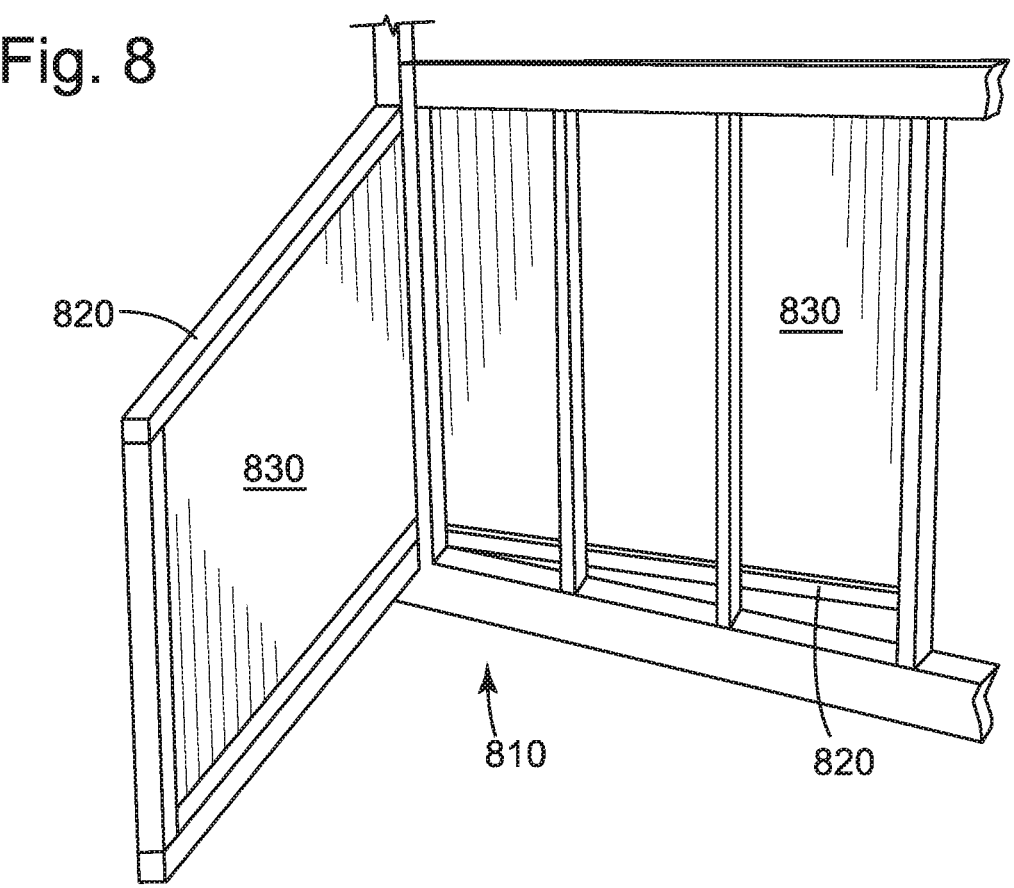
FIG. 8 is a perspective view drawing of one embodiment of a studded wall 810 with swinging panel frames 820 on either side of the studded wall.

FIG. 8 is a perspective view drawing of one embodiment of a studded wall 810 with swinging panel frames 820 on either side of the studded wall. The studded wall 810 may be made of metal studs in order to survive fire training exercises. The swinging panel frames 820 may receive a wall panel 830 made of a standard construction material such as drywall. During fire training exercises, personnel can break through the wall panels 830 in order to simulate breaking through a wall made of standard construction materials during a fire.

Figure 9:
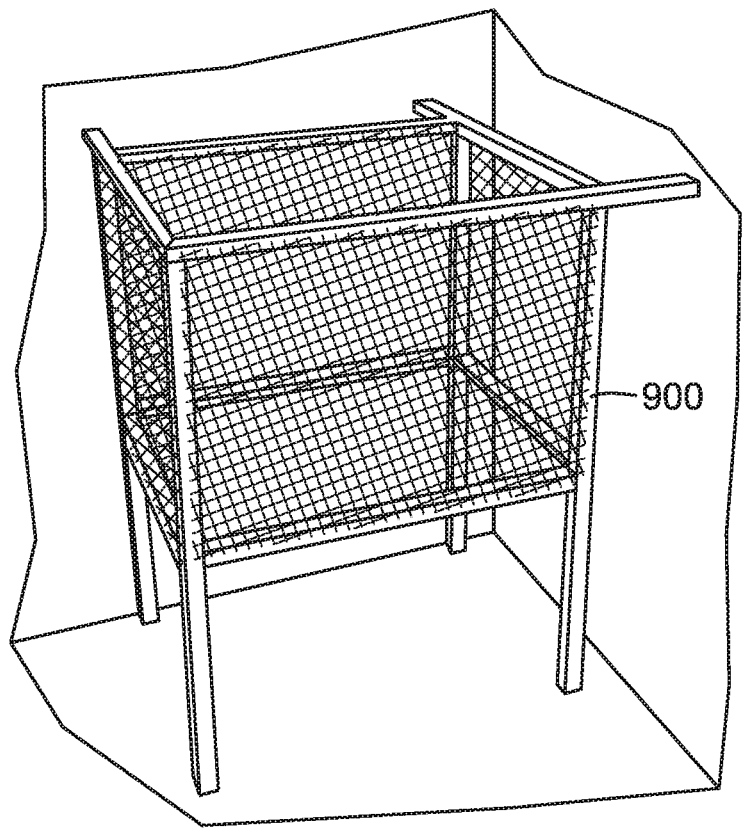
FIG. 9 is a perspective view drawing of one embodiment of a fire receptacle.

FIG. 9 is a perspective view drawing of one embodiment of a fire receptacle 900. The fire receptacle 900 may be placed in one or more rooms 220 and filled with a burnable material such as matted wood fiber that generates heat and smoke suitable for fire training exercises.

Figure 10:
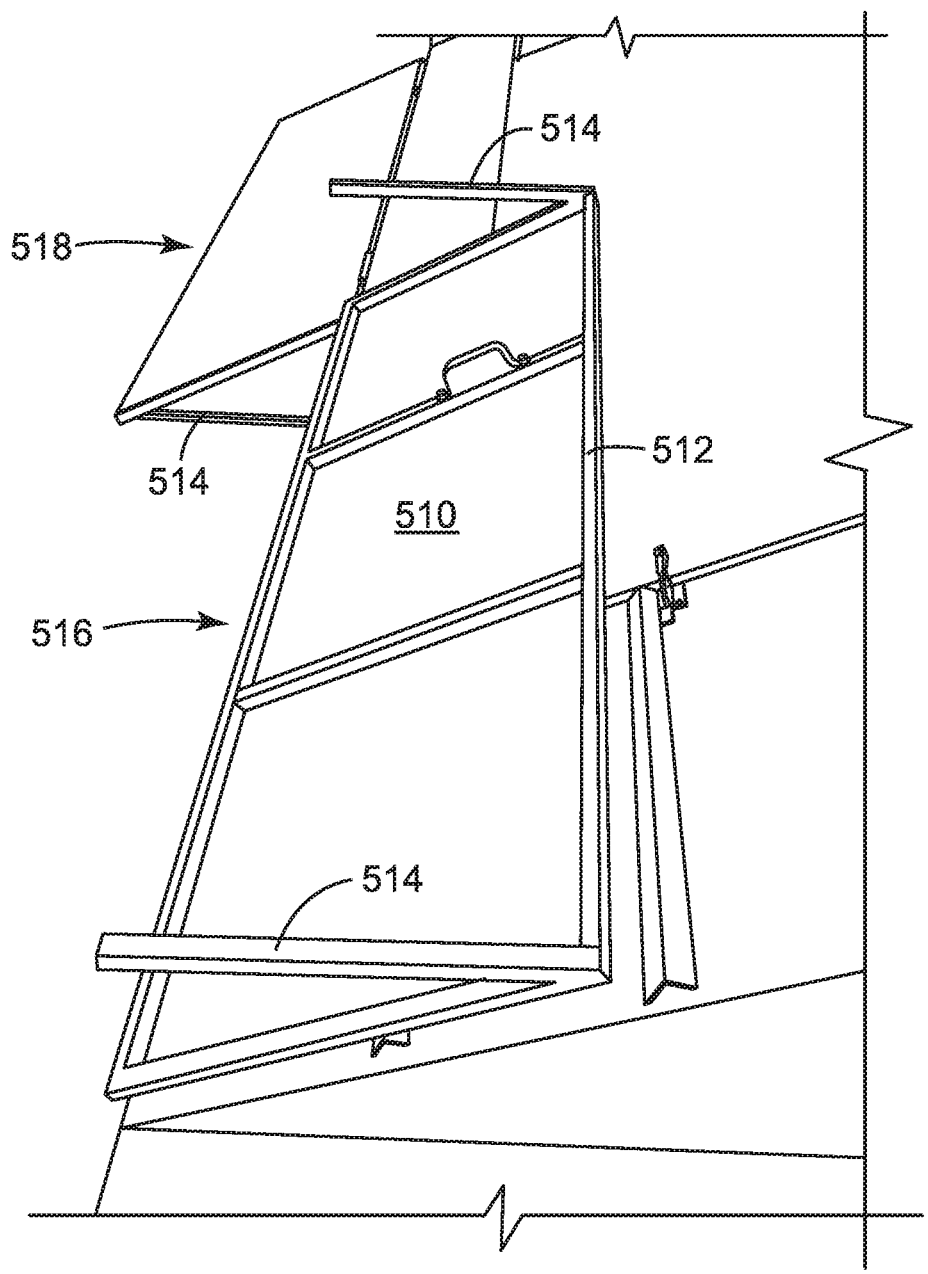
FIG. 10 is a perspective view drawing showing additional details of one embodiment of a roof extension.

FIG. 10 is a perspective view drawing showing additional details of one embodiment of the roof extension 510. The roof extension 510 may include a frame 512 and one or more stops 514 that rest against the exterior wall of the shell 210 when the roof extension is pivoted from a transport position 516 to a deployed position 518.

Figure 11:
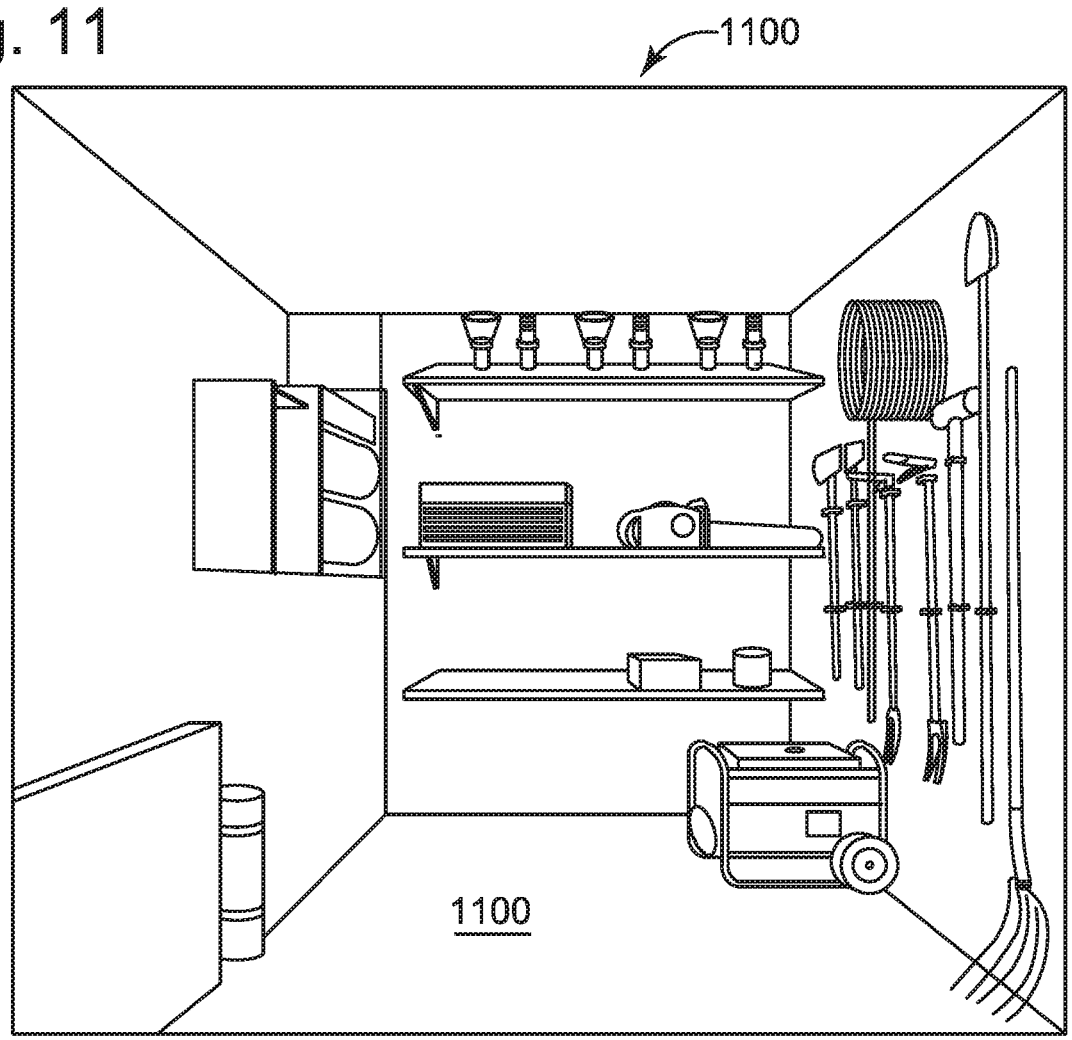
FIG. 11 is a perspective view drawing depicting one embodiment of a fire training equipment storage room.

FIG. 11 is a perspective view drawing depicting one embodiment of a fire training equipment storage room 1100. The fire training equipment storage room 1100 may be one of the rooms 220 within the shell 210 that is attached to the trailer frame 110. The fire training equipment storage room 1100 may store equipment and the like that is suitable for fire training exercises.

Figure 12:
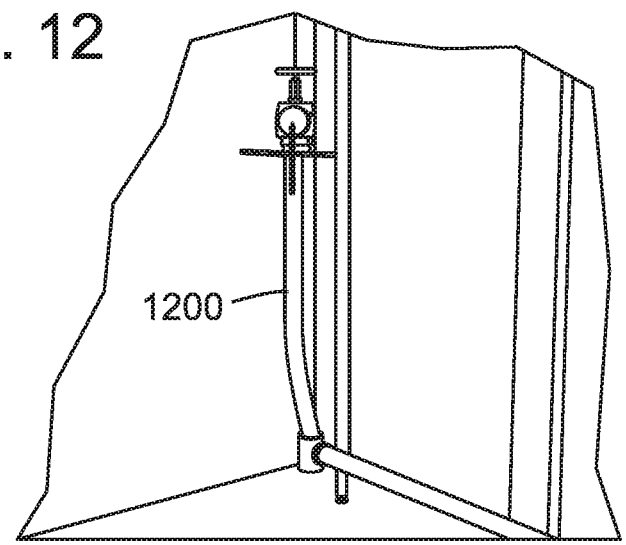
FIG. 12 is a perspective view drawing depicting one embodiment of a standpipe.

FIG. 12 is a perspective view drawing depicting one embodiment of a standpipe 1200. The standpipe 1200 may be place within a room 220 and/or on the exterior of the fire training apparatus 200. The standpipe 1200 may be functionally identical to standpipes found in apartment buildings and commercial buildings. The standpipe 1200 enables connecting a fire fighting hose during fire training exercises and receiving water delivered to the standpipe by a pumping truck or the like.

It should be noted the features, structures, or characteristics of the invention such as those described above may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A transportable fire training apparatus, the apparatus comprising:
    a trailer frame having a rear raised section at a rear end of the trailer frame and an unraised section at a middle portion of the trailer frame, wherein the rear raised section and the unraised section are fixedly parallel to one another;
    a shell attached to the trailer frame and partitioned into a plurality of training rooms by a plurality of metal studded walls;
    a panel frame disposed adjacent to a metal studded wall of the plurality of metal studded walls, wherein the panel frame is rotatably coupled to the metal studded wall;
    a wall panel made of a construction material, wherein the panel frame is configured to enable insertion of the wall panel therein prior to a fire training exercise and removal of the wall panel therefrom after the fire training exercise;
    a rear multi-axle wheel set disposed below, and attached to, the rear raised section of the trailer frame via an air ride suspension system that raises the trailer frame relative to the rear multi-axle wheel set in response to pressurization of the air ride suspension system; and
    wherein the unraised section of the trailer frame rides above the ground when the air ride suspension system is in a pressurized state and the unraised section of the trailer frame rests on the ground when the air ride suspension system is in an unpressurized state.

2. The apparatus of claim 1, wherein the trailer frame comprises a front raised section at a front end of the trailer frame, the front raised section configured to attach to a tractor having a multi-axle wheel set, wherein the front raised section is fixedly parallel to the rear raised section and the unraised section.

3. The apparatus of claim 2, further comprising a tractor attached to the trailer frame.

4. The apparatus of claim 2, further comprising a pair of extendable landing supports attached to the front raised section of the trailer frame.

5. The apparatus of claim 4, wherein the pair of extendable landing supports each comprise a hydraulic ram.

6. The apparatus of claim 4, wherein the pair of extendable landing supports facilitate coupling the tractor to the trailer frame and decoupling the tractor from the trailer frame.

7. The apparatus of claim 1, further comprising a slideout for increasing the volume of a room of the plurality of rooms.

8. The apparatus of claim 7, wherein the slideout comprises a window.

9. The apparatus of claim 1, wherein the shell comprises a roof with a replaceable panel for providing access to the roof from within the shell.

10. The apparatus of claim 1, wherein the shell comprises a pitched roof.

11. The apparatus of claim 10, further comprising a roof extension pivotally attached to the shell and configured to extend the pitched roof and simulate a roof overhang when deployed, the roof extension comprising a frame and one or more stops that rest against an exterior wall of the shell when the roof extension is pivoted from a transport position above the shell to a deployed position lateral to the shell.

12. The apparatus of claim 1, comprising an interior rear stairwell for accessing the raised rear section and the roof from the unraised section.

13. The apparatus of claim 1, further comprising a standpipe for connecting a fire fighting hose thereto.

14. The apparatus of claim 1, further comprising a storage room for fire training equipment.

15. The apparatus of claim 1, wherein the plurality of training rooms is partitioned by at least four fixed metal studded walls.

16. The apparatus of claim 1, further comprising a fire receptacle disposed in a training room of the plurality of training rooms, the fire receptacle configured to receive a burnable material for generating heat and smoke suitable for the fire training exercise.

17. A fire training method comprising:
    providing a fire training apparatus comprising a trailer frame having a rear raised section at a rear end of the trailer frame and an unraised section at a middle portion of the trailer frame with the rear raised section fixedly parallel to the unraised section, a shell attached to the trailer frame and partitioned into a plurality of training rooms by a plurality of metal studded walls, a panel frame disposed adjacent to a metal studded wall of the plurality of metal studded walls, wherein the panel frame is rotatably coupled to the metal studded wall, a wall panel made of a construction material, wherein the panel frame is configured to enable insertion of the wall panel therein prior to a fire training exercise and removal of the wall panel therefrom after the fire training exercise, a rear multi-axle wheel set disposed below, and attached to, the rear raised section of the trailer frame via an air ride suspension system that raises the trailer frame relative to the rear multi-axle wheel set in response to pressurization of the air ride suspension system, wherein the unraised section of the trailer frame rides above the ground when the air ride suspension system is in a pressurized state and the unraised section of the trailer frame rests on the ground when the air ride suspension system is in an unpressurized state;

transporting the fire training apparatus to a training location with the air ride suspension system in a pressurized state; and un-pressurizing the air ride suspension system to rest the unraised section of the trailer frame on the ground.

18. The method of claim 17, further comprising conducting fire training exercises using the fire training apparatus.

19. The method of claim 17, wherein transporting the fire training apparatus comprises attaching the fire training apparatus to a tractor.

20. The method of claim 17, wherein transporting the fire training apparatus comprises retracting an extendable landing support.

* * * * *